Inventor:
Anton Seelig
By: Spencer & Kaye
Attorneys

United States Patent Office 3,328,725
Patented June 27, 1967

3,328,725
OSCILLATING CIRCUIT INVERTER PRODUCING
A LOW DISTORTION OUTPUT
Anton Seelig, Weilbach, Germany, assignor to Licentia-Patentverwaltungs-G.m.b.H., Frankfurt am Main, Germany
Filed Feb. 24, 1966, Ser. No. 529,730
Claims priority, application, Germany, Feb. 24, 1965,
L 50,045
4 Claims. (Cl. 331—113)

ABSTRACT OF THE DISCLOSURE

An oscillating circuit inverter including a resonant circuit inductance across which the inverter output appears, a plurality of capacitors, and a plurality of saturable chokes each connected between one terminal of a respective capacitor and one terminal of the circuit inductance, each choke having a predetermined magnetic reversal time which is equal to $(n-1)$ times one half the period of each cycle of the output wave, where $n$ equals the total number of capacitors, for providing an output having a substantially undistorted waveform even when the duration of each halfwave of the output signal is substantially smaller than the magnetic reversal time of each choke.

---

The present invention relates to a circuit device, and particularly to an oscillating circuit inverter.

It has been suggested to construct one type of inverter in which a saturable choke is connected in a resonant circuit consisting of an inductance and a capacitance, and one or several control led rectifiers are connected to charge the capacitance, during the magnetic reversal time of the choke, from an operating voltage source through the intermediary of a charging inductance. The resonant circuit output is itself damped by the external load to which it is connected. The choke disposed in the resonant circuit has a saturable core made of ferromagnetic material and is so designed as to have a considerably higher inductance than the charging inductance when in unsaturated condition, but a smaller inductance than the resonant circuit inductance when in saturated condition.

The function of the choke is to delay the successive half-waves of the current of the resonant circuit by a specific time interval $\Delta t$ which represents the magnetic reversal time of the core material. During this time $\Delta t$, only a very small current flows through the choke, which current is negligible in comparison with the resonant circuit current itself. The oscillations through the choke are thus effectively interrupted during the time of magnetic reversal.

During this time $\Delta t$, the capacitor which provides the resonant circuit capacitance is recharged by way of the controlled rectifier and the charging inductance. At the end of each period of current flow through the controlled rectifier, a sufficient time interval must be allowed to permit the rectifier to be rendered non-conductive so that it will block current in the forward direction, when the associated choke begins conducting. Thus, the time interval $\Delta t$ must be at least equal to the sum total of the capacitor charging time and the rectifier turn-off time. At higher frequencies, the duration $T/2$ of each half-wave of the oscillating circuit current will become equal to or smaller than the time interval $\Delta t$. When this occurs, the current wave will be greatly distorted and the output supplied to the load resistance will become smaller with the ratio $$\frac{T/2}{T/2+\Delta t}$$

It is a primary object of the present invention to eliminate these drawbacks.

A more specific object of the present invention is to provide an inverter which is capable of supplying an output with an undistorted wave form even when the duration $T/2$ of each half-wave of the resonant circuit output current is substantially smaller than the time interval $\Delta t$.

The objects of the present invention are realized by the provision of an oscillating circuit inverter which includes a resonant circuit inductance, a plurality of $n$ capacitors, and a plurality of $n$ saturable chokes each connected between one terminal of a respective one of the capacitors and one terminal of the circuit inductance. Each of these chokes has a predetermined magnetic reversal time which is equal to $(n-1)$ times the half-wave duration $T/2$ at which one capacitor reverses its charge. The arrangement according to the present invention also includes a plurality of controlled rectifiers, at least one for each capacitor, each rectifier being connected to supply a periodic charging current to one of the capacitors. There is also provided a charging inductance connected for supplying charging current from a voltage source to the capacitors through the rectifiers. Finally, there are provided means connected for rendering the rectifiers conductive in sequence for driving the chokes successively and temporarily into saturation, this means being operated to control the rectifiers so as to cause only one of the chokes to be in saturation at any given time.

Additional objects and advantages of the present invention will become apparent upon consideration of the following description when taken in conjunction with the accompanying drawings in which:

FIGURE 1b is a diagram showing the current waveforms appearing during operation at different points in the device of FIGURE 1a.

Figure 1A:
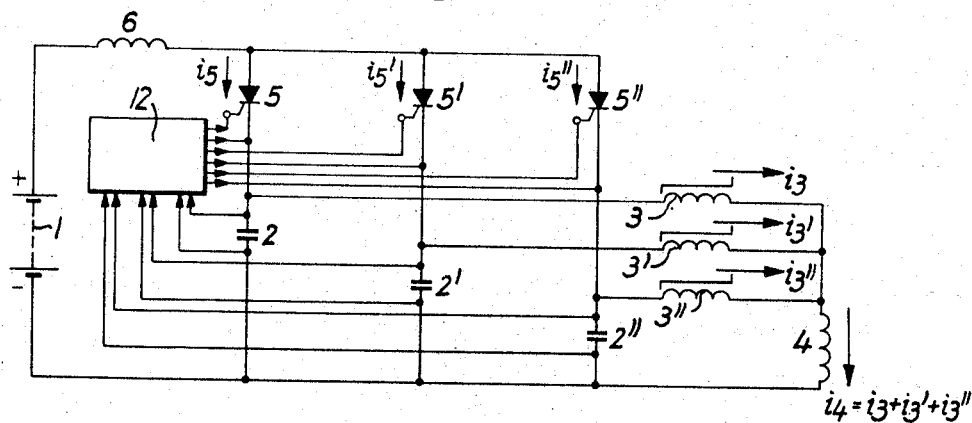
FIGURE 1a is a circuit diagram of a first embodiment of the present invention.

FIGURE 1a shows a rectifier circuit including three controlled rectifiers 5, 5′ and 5″ which may be constituted by thyristors, for example, and which have their anodes connected to the positive terminal of a D.C. voltage source 1 through the intermediary of a charging inductance 6. The negative terminal of the D.C. voltage source 1 is connected to one terminal of each of three capacitors 2, 2′ and 2″ and to one terminal of a resonant circuit inductance 4. Each of the capacitors has its other terminal connected to the cathode of a respective one of the rectifiers 5, 5′ and 5″. The junction between each capacitor and its associated controlled rectifier is connected to the other terminal of the resonant circuit inductance 4 through the intermediary of a respective one of the saturable chokes 3, 3′ and 3″. Each of the controlled rectifiers 5, 5′ and 5″ has a control electrode connected to a suitable source of timing pulses 12. Source 12 may be of any well-known, commercially-available device capable of providing a suitable plurality of control pulse trains, each of which trains is phase shifted with respect to the others. The mode of operation of source 12 (FIG. 3) is explained below.

Figure 1B:
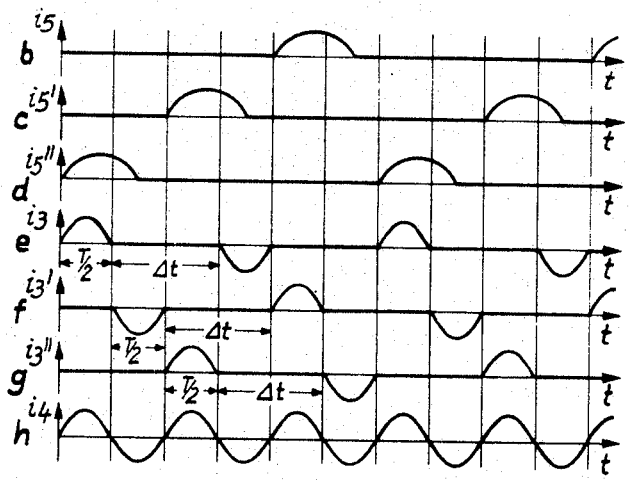

The operation of this device will be described in connection with the current waveforms of FIGURE 1b. In operation, control pulses are sent to the control electrodes of the rectifiers 5, 5′ and 5″, in a sequence which causes each rectifier to conduct in succession. Thus, curve $b$ of FIGURE 1b shows the waveform of current $i_5$ passing through rectifier 5 and capacitor 2, curve $c$ shows the waveform of the current $i'_5$ passing through rectifier 5' and capacitor 2', and curve $d$ shows the waveform of the current $i''_5$ passing through rectifier 5" and capacitor 2". As may be seen, after each rectifier is rendered conductive by a control pulse from unit 12, current flows therethrough until its associated capacitor has been charged to substantially the voltage of source 1, at which time the current through the controlled rectifier will fall below the minimum conduction value thereof, and the rectifier will automatically return to its non-conductive condition. Then, after a time interval $\Delta t$ determined by the design of the associated one of the chokes 3, 3' and 3", the charge stored in the capacitor will pass in the form of a current through the associated choke to the inductor 4 constituting the primary inductance of the resonant circuit. After the associated capacitor has reversed its charge, the current level through the choke has fallen to zero and will remain at this lever for another time interval $\Delta t$. At the end of this time interval, the saturable reactor gets into saturation again and current will flow back in the opposite direction through inductor 4 until the associated capacitor has reversed its charge once again. This is illustrated in curves $e$, $f$, and $g$, of FIGURE 1b wherein curve $e$ represents the waveform of the current $i'_3$ through the choke 3, curve $f$ shows the waveform of current $i'_3$ through the choke 3' and curve $g$ the current $i''_3$ through the choke 3". As may be seen from these curves, the magnetic reversal time $\Delta t$ of each choke is equal to $(n-1)$ times half-wave duration $T/2$, at which time one capacitor reverses its charge, where $n$ equals the number of capacitors or chokes. All of the currents flowing through the chokes 3, 3' and 3" are added in the inductor 4 to produce the alternating current $i_4$, shown in curve $h$.

It may thus be seen that it is only necessary for the control unit 12 to supply a pulse to each of the controlled rectifiers 5, 5' and 5" at the beginning of every third cycle of the alternating current appearing across inductor 4, each control pulse to each controlled rectifier occuring at a time T after each control pulse applied to the next succeeding rectifier, the time period T being equal to the oscillation period of the signal appearing across inductor 4. The approximately sinusodial waveform of each current pulse through the chokes 3, 3' and 3" being determined by the LC resonant circuit constituted primarily by the capacitors 2, 2' and 2" and the inductor 4.

It may thus be seen that the present invention permits a sinusoidal output voltage to be produced in an arrangement in which the magnetic reversal time $\Delta t$ of each switching choke is substantially greater than the half wave duration $T/2$. In addition, the present invention provides a circuit in which only one choke will be in its saturated condition at any given time.

It may be noted that in order to provide a continuously varying, substantially sinusoidal output current wave, it is necessary that, in the illustrated embodiment, the time interval $\Delta t$ be twice as long as the half wave duration $T/2$.

Figure 2:
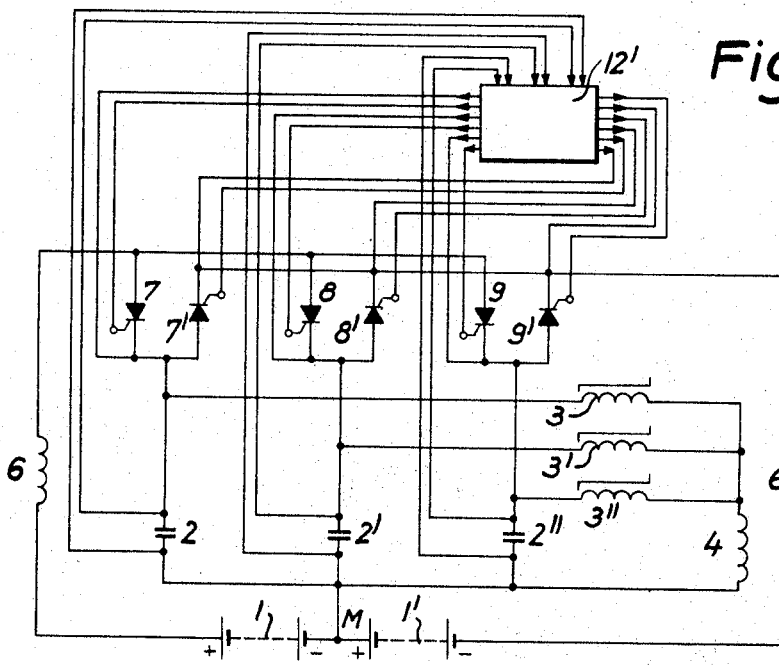
FIGURE 2 is a schematic diagram of another embodiment of the present invention.

Referring now to FIGURE 2, there is shown a modification of the arrangement of FIGURE 1a for producing an output which represents an even closer approximation to a sinusoidal wave. The arrangement of FIGURE 2 is identical with that of FIGURE 1a with the exception that two controlled rectifiers are provided in place of each rectifier of FIGURE 1a and the potential source is constituted by two voltage producing portions 1 and 1', each connected to one set of controlled rectifiers through the intermediary of a respective one of the charging inductances 6 and 6'.

As may be seen from FIGURE 2, controlled rectifiers 7, 8 and 9 have their anodes connected to charging inductance 6, while the controlled rectifiers 7', 8' and 9' have their cathodes connected to charging inductance 6', inductance 6 being connected to the positive terminal of portion 1 and inductance 6' being connected to the negative terminal of portion 1'. Control pulse unit 12', which is a modified version of unit 12, is connected to all of the controlled rectifiers for rendering the rectifier 7, 8 and 9 conductive in the same manner as the rectifiers 5, 5' and 5" of FIGURE 1a, and for rendering the rectifiers 7', 8' and 9' conductive in the intervals between the moments when the associated ones of rectifiers 7, 8 and 9 are rendered conductive. Thus, for example, rectifier 7' will be rendered conductive by a pulse from unit 12' at a time of $3T/2$ after each instant when the rectifier 7 has been rendered conductive. As a result, each of the capacitors 2, 2' and 2" will be alternately recharged to a voltage of one polarity and then to a voltage of the opposite polarity by current flowing through the controlled rectifiers with which it is connected and the current waveforms through each of the chokes 3, 3' and 3" will have an identical shape for each direction of current flow therethrough, so that the resulting current wave through induction 4 will have a very nearly sinusoidal shape.

It should of course be appreciated that the number of capacitors and chokes is not limited to three in devices constructed according to the present invention. A greater number of controlled rectifier-capacitor-choke arrangements can be utilized when it is desired to generate an output sine wave having a higher frequency. In this connection it should be appreciated that the number of capacitors and chokes used depends on the frequency desired because the shortest magnetization time $\Delta t$ for any one choke must not be less than the total capacitor charging time and associated rectifier turn-off time. As a general rule it may be stated that $n$ capacitor-choke arrangements may be utilized to provide a continuously varying output current, with the time of magnetic reversal $\Delta t$ of each choke being equal to $(n-1)$ times the half-wave duration $T/2$ of each sinusoidal current pulse flowing in the $n$ capacitors and the inductance 4. Thus, in order to construct a circuit producing an output current of a desired frequency, it is only necessary to design each capacitor and the inductance 4 so that the duration of each current pulse is equal to one half the period of oscillation of the desired output wave and then, depending on the required magnetic reversal time $\Delta t$ of each choke to provide a number $n$ of capacitor-choke arrangements such that $(n-1)$ times the half wave duration of each current pulse is equal to the choke magnetic reversal time $\Delta t$. In order to provide an output having successive positive and negative current half-waves, it is necessary that an odd number of capacitor-choke arrangements be provided.

It will be understood that the above description of the present invention is susceptible to various modifications, changes and adaptations, and the same are intended to be comprehended within the meaning and range of equivalents of the appended claims.

Figure 3:
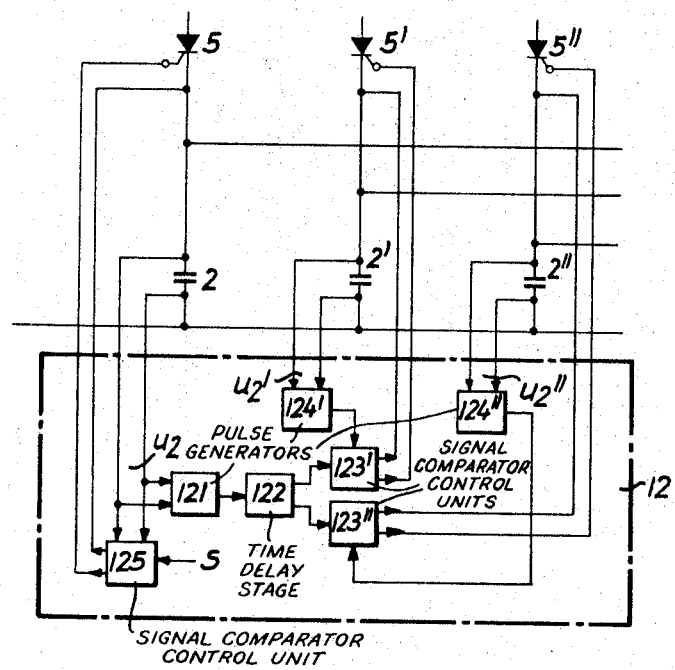
FIGURE 3 represents the schematic diagram of a control device furnishing control signal pulses.

FIGURE 3 shows a form of arrangement for the source 12 with the component parts enclosed by dot-dash lines; its output signals control the thyristors 5, 5' and 5". These thyristors, as is shown in FIGURE 1, are connected in series with capacitors 2, 2' and 2".

In explaining the mode of operation it is assumed that that part of the circuit formed by thyristor 5 and capacitor 2 will serve as the leading pulse transmitter for the other two portions of the circuit; any one of them may however be selected for the leading part.

An alternating voltage $u_2$ derived from capacitor 2 is fed to a pulse generator 121 and delivers a signal in the usual manner as soon as the voltage $u_2$ undergoes a certain change such as passing through zero.

The output signal from stage 121 operates a time delay stage 122 which yields two delayed signals delayed by 120 and 240 electrical degrees, respectively, with respect to the input signal to stage 122.

These signals represent desired or set values supplied to the two control units 123' and 123"; these latter furnish the ignition signal for the other two circuit portions operating in dependence upon the leading circuit portion. The actual value signals for these control units are received from two further pulse generators 124' and 124'', the input signals of which are the alternating voltages $u'_2$ and $u''_2$ across their respective capacitors 2' and 2''.

Corresponding to the mode of operation of pulse generator 121 for the leading circuit part, the pulse generators 124' and 124'' will deliver an output signal whenever the input signals $u'_2$, $u''_2$ undergo a certain change such as passing through zero.

Control units 123' and 123'' furnish their firing signals in dependence upon the time differential between the occurence of the set and actual value signals. The units 123' and 123'' control thyristors 5' and 5'', respectively, in such a manner as to cause the aforesaid time differential to disappear.

Thyristor 5 of the leading circuit portion receives its firing signal from the control unit 125. Unit 125 receives the capacitor voltage $u_2$ and produces firing signals relative to a definite state of the incoming AC-voltage, e.g. its passage through zero. Shifting of the firing signals so as to change the output of the static inverter can be effected by shifting the control voltage S.

For the purpose of controlling an inverter in accordance with FIGURE 2 the circuit components 125, 123' and 123'' must be made capable of giving off an additional firing pulse signal each. This must have a 180 degrees phase displacement to operate the thyristors 7', 8', 9' which are poled in the opposite direction from thyristors 7, 8 and 9.

What is claimed is:

1. An oscillating circuit inverter comprising, in combination:
   (a) a resonant circuit inductance for providing and alternating current across an external load;
   (b) a plurality of $n$ capacitors, where $n$ is an integer greater than one;
   (c) a plurality of $n$ saturable chokes each connected between one terminal of a respective one of said capacitors and one terminal of said circuit inductance, each of said chokes having a predetermined magnetic reversal time which is equal to $(n-1)$ times the half-wave duration of the sinusoidal current pulses supplied to said inductance by said chokes;
   (d) a plurality of controlled rectifiers, at least one for each capacitor, each rectifier being connected to supply a periodic charging current to one of said capacitors;
   (e) a charging inductance connected for supplying charging current from a voltage source to said capacitors through said rectifiers; and
   (f) means connected for rendering said rectifiers conductive in sequence for driving said chokes successively and temporarily into saturation said means controlling said rectifiers for causing only one of said chokes to be in saturation at any given time.

2. An arrangement as defined in claim 1 further comprising a voltage source, and wherein each of said capacitors has its other terminal connected to one terminal of said voltage source and to the other terminal of said circuit inductance, and each of said capacitors has its said one terminal connected, by way of a respective one of said controlled rectifiers, to the other terminal of said voltage source.

3. An arrangement as defined in claim 1 comprising a voltage source having two voltage-producing portions connected in a series-aiding manner, and wherein each of said capacitors has its other terminal connected to the junction between said voltage producing portions and to the other terminal of said circuit inductance, and two controlled rectifiers are provided for each capacitor, each said capacitor having its said one terminal connected to its associated rectifiers, said associated rectifiers being poled in respective opposite directions with respect to their associated capacitor, with one of said rectifiers associated with each said capacitor being connected to one terminal of said voltage source, and with the other said rectifier associated with each said capacitor being connected to the other terminal of said voltage source.

4. An arrangement as defined in claim 3 wherein said charging inductance is constituted by two inductors each connected in series between a respective terminal of said voltage source and those of said rectifiers connected to that terminal of said source.

No references cited.

ROY LAKE, *Primary Examiner.*

J. KOMINSKI, *Assistant Examiner.*